United States Patent [19]

Eidam

[11] 4,204,304
[45] May 27, 1980

[54] TRAVEL LIMIT STOP PIN

[76] Inventor: Lane L. P. Eidam, 38 Watergate, South Barrington, Ill. 60010

[21] Appl. No.: 882,405

[22] Filed: Mar. 1, 1978

[51] Int. Cl.$^2$ .................. B23B 31/16; B23Q 3/157
[52] U.S. Cl. .................................... 29/26 A; 29/568; 279/82; 408/35; 409/232
[58] Field of Search ............... 279/1 B, 1 S G, 82, 279/87, 89, 24, 28, 29; 408/35; 29/26 A, 568; 90/11 A; 409/232

[56] References Cited
U.S. PATENT DOCUMENTS 3,999,769   12/1976   Bayer, et al. ................... 279/1 B Primary Examiner—Z. R. Bilinsky
Attorney, Agent, or Firm—Gerald S. Geren

[57] ABSTRACT

There is disclosed herein an improved tool holder-/adapter for use in a mechanical and automatic machine tool. The machine tool includes: (1) a drive spindle; and (2) a rotary turret for releasably storing a plurality of tool holder/adapters. Each holder/adapter is secured to the turret by a set of radially movable locking pins which are cammed to a radially outward position. There is also provided a set of axially movable travel limit stop pins for cooperation in maintaining the locking pins in a radially outward position. The travel limit stop pins cooperate with the spindle for releasing the locking pins and permitting them to move radially inwardly so as to release the tool holder/adapter from the turret. The stop pin construction and location combine to provide both positive and blocking engagement between the lock pin and stop pin so as to prevent unintentional inward movement of the lock pin and possible unintentional holder/adapter-turret disengagement.

4 Claims, 6 Drawing Figures

U.S. Patent  May 27, 1980  Sheet 1 of 3  4,204,304
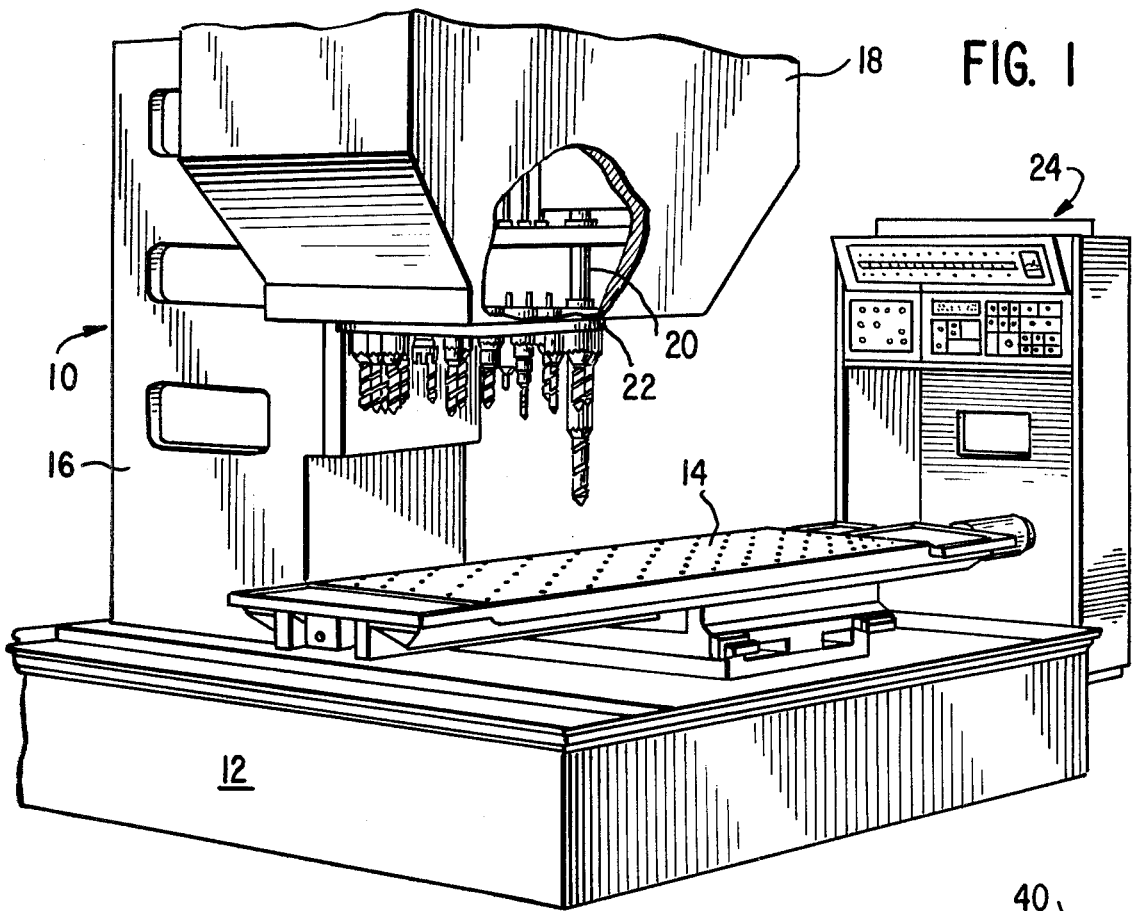
FIG. 1
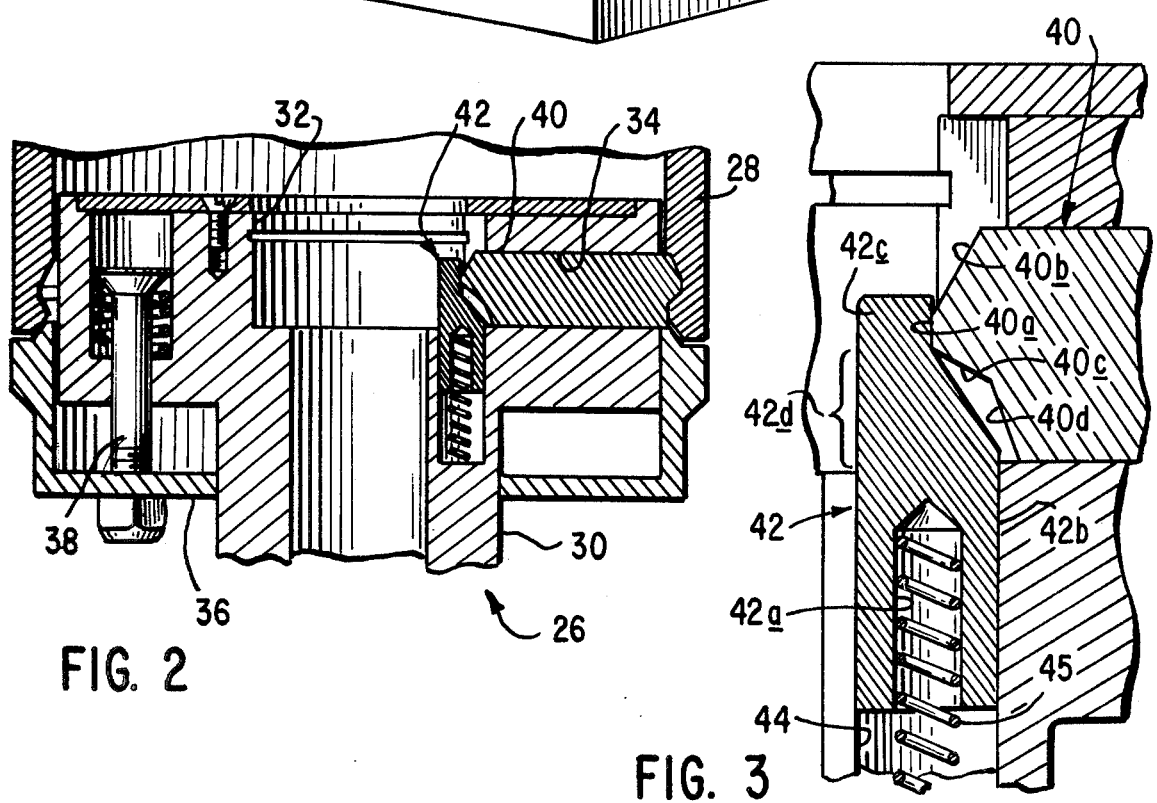
FIG. 2
FIG. 3

TRAVEL LIMIT STOP PIN

BACKGROUND OF THE INVENTION

This invention relates to high speed, high torque automatic machine tools, and more particularly, to apparatus for quickly and securely locking a tool holder/adapter to a drive spindle associated with the machine tool.

Modern high speed machine tools employ many different types of tools for drilling, boring, milling, etc., in its machining operation. Each tool is mounted to a tool holder/adapter which is selectively engaged by the machine's drive spindle to perform the desired machining operation. U.S. Pat. No. 3,999,769 discloses one such tool holder/adapter.

Desirably, the tool holder/adapter cooperates with the drive spindle to permit quick and secure changing from one tool to another. When not in use, the tool holder/adapter is stored in a turret on the machine. When a tool is to be used, the turret is moved to align the tool holder/adapter with the drive spindle, which is then moved downwardly to engage the tool holder/adapter and release it from the turret. U.S. Pat. No. 3,999,769 discloses a spindle which includes a step-shaped nose for engagement by the tool holder/adapter. The tool holder/adapter includes a straight-sided central recess for receiving the nose, an upwardly-biased peripheral retainer cup or locking ring, and a lock pin and a detent pin mechanism, all of which are intended to selectively secure the tool holder/adapter to either the spindle nose or the turret.

The locking mechanism includes three radially movable lock pins, each end of which is provided with a shaped face. Each locking pin is movable within a passageway toward and away from the central recess. An axially-movable spring-loaded detent pin is provided for cooperation with each locking pin. The detent pin is positioned partially in the passageway and partially in the central recess.

In the stored position in the turret: (1) the peripheral retainer cup is held in a downward position; (2) the lock pin is positioned radially outwardly with its inner end fully within the passageway and its outer end engaging the turret; and (3) the detent pin is positioned upwardly and contacts a portion of the inner face of the lock pin within the passageway and is intended to hold the lock pin in the outward position. When the drive spindle is moved into the central recess, it is intended that it engage the top side of the detent pin, and push it downwardly so as to release the lock pin and permit it to move inwardly into the recess. As the drive spindle urges the tool holder/adapter downwardly, the lock pin moves inwardly, the outer end releases from the turret and the inner end engages the stepped spindle nose. At the same time, the retainer cup moves upwardly to prevent the lock pin from moving outwardly and releasing the nose until the tool holder/adapter is returned to storage.

Although this system is intended to provide positive locking to the spindle and to the turret, it has been found: (1) that the tool holder/adapters have been driven from the turret without engaging the spindle nose; and (2) that positive locking to the turret for storage has not always been achieved.

The reason for the foregoing problems appears to be related to improper functioning of the locking pin due to sticking or slippage of the detent pin. For example, if only one of the detent pins sticks and fails to engage the associated locking pin, the tool holder/adapter may not lock securely to the turret. Thus, the locking pin may extend into the central cavity so that: (1) when the spindle nose enters the recess, it will strike the top of the locking pin, thereby driving the holder/adapter from the turret, without the nose being securely engaged; or (2) the tool holder/adapter may work loose from the turret during operation of the machine.

It is also possible that due to the sloped and mating surfaces of the detent pin and locking pin, the locking pin can work against the detent pin in a cam-like manner so as to urge the detent pin downwardly and (1) permit the lock pin to move inwardly and be struck by the descending spindle nose or (2) permit the tool holder/adapter to work loose from the turret.

It is therefore an object of this invention to provide a mechanism for securely and safely locking a tool holder/adapter in a storage position and to a drive spindle nose.

These and other objects of this invention will become apparent from the following description and appended claims.

SUMMARY OF THE INVENTION

There is provided by this invention a tool holder/adapter having an improved mechanism for safely and securely locking the tool holder/adapter to a turret for storage and to a drive spindle for operation. The improved mechanism provides for rapid selection of tools without accidental tool holder/adapter slippage from the turret and provides for positive locking of the lock pins in the outward position.

The improved mechanism includes a travel limit stop pin which is shaped so that its active or lock pin contacting surface is positioned within the central recess of the tool holder/adapter. Furthermore, the stop pins are shaped so as to engage the innermost surface of the lock pin, thereby eliminating camming and slippage between the lock pin and the stop pin, which, in turn, assures positive positioning of the locking pin in the locked-to-the-turret position.

In one embodiment, the entire pin is axially aligned with the central recess, and in another embodiment, only the contacting surfaces of the pin is aligned with the central recess.

BRIEF DESCRIPTION OF THE DRAWINGS

FIG. 1 is a perspective view showing a machine tool;

FIG. 2 is a vertical sectional view showing a tool holder/adapter secured to a storage turret;

FIG. 3 is a greatly enlarged view showing the engagement between the travel limit stop pin and locking pin;

DESCRIPTION OF THE PREFERRED EMBODIMENT

Figure 4:
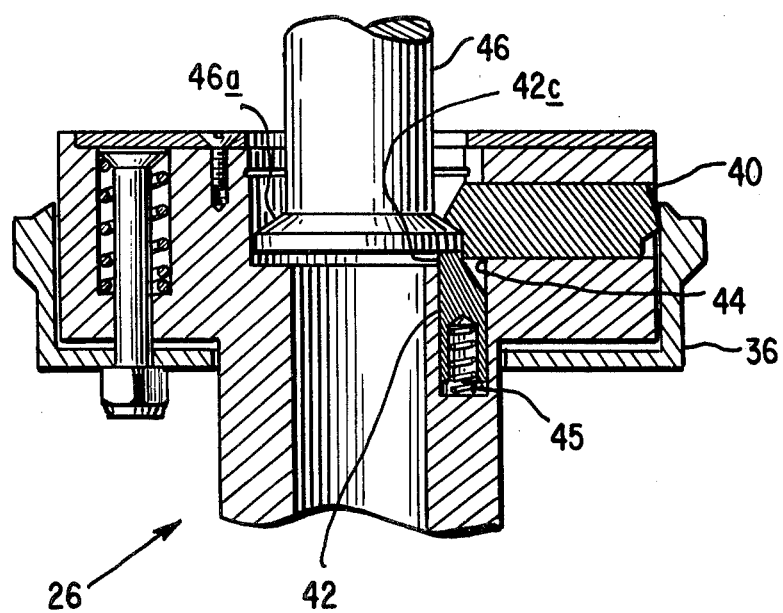
FIG. 4 is a vertical sectional view showing the tool holder/adapter secured to a spindle nose.

Referring now to FIG. 1, there is shown a machine tool 10 generally, which is an automatically controlled machine tool adapted to perform several successive machining operations that require numerous tools to be exposed and ready for use. The machine includes a bed 12 having a movable table 14 thereon. A frame 16 extends upwardly from the bed and a drive housing 18 is mounted to the frame. The drive shaft and tool spindle 20 are positioned within the housing 18 for both axially reciprocal and rotational movement. An annular tool holder turret plate 22 is mounted to the bottom of the housing and is rotatable so that each tool in the turret can be aligned with the spindle 20. A numerical control center 24 is provided for automatically operating the tool selection and worktable positioning processes. Alternatively, these functions may be controlled mechanically or by tape.

Referring now to FIG. 2, a tool holder/adapter 26 is shown secured to a storage ring 28 which forms part of the turret 22. The adapter includes a body 30 having a central recess 32 and three radially disposed lock pin passageways, such as 34. A retainer cup or locking ring 36 is carried by the body 30 and is biased upwardly through spring-biasing assemblies, such as 38, which permit the retainer ring to move axially relative to the body 30. Three lock pins, such as 40, are provided and each is positioned in one of the lock pin passageways, such as 34. Each of the lock pins is movable between an inner position in which the inner end extends into the central recess and an outer position in which the outer end of the pin extends outwardly from the periphery of the body.

Three travel limit stop pins, such as 42, are also provided. Each stop pin is arranged for cooperation with the inner end of the lock pin 40.

Referring now to FIG. 3, the inner end of the lock pin 40 and the stop pin 42 are seen in greater detail. The inner end of the lock pin includes a shaped face having an inner surface 40a which defines the innermost edge of the pin 40. An outwardly and upwardly sloping surface 40b is provided above the surface 40a and downwardly and outwardly sloping surfaces 40c and 40d are positioned below the innermost edge 40a.

The stop pin 42 is positioned in a bore 44; is slidably movable between an extended or locking position and a retracted or release position; and is upwardly biased. The pin includes an internal bore 42a for receiving a coiled compression biasing spring 45 which urges or biases the stop pin upwardly. The stop pin shown in FIG. 3 has a cylindrical lower section 42b and a cylindrical tip 42c which is offset or eccentric with respect to the lower section 42b. The pin is constructed so that the tip 42c is fully within the central recess. In this particular construction, one side of the tip is aligned with the innermost side of the lower section pin. The intermediate section 42d connects the tip with the lower section 42b and a lock pin contacting shoulder is formed at their junction for limiting upward movement of the stop pin. As can be seen from the drawings, the tip 42c, when in its upper position, engages the innermost edge 40a and is positioned between the innermost edge and the center of the recess so as to provide a positive blocking action which avoids any camming action while also assuring a positive lock.

Referring now to FIG. 4, it will be seen that the tool holder 26 generally is locked to the flanged drive spindle nose 46. In this configuration, the retainer cup 36 is in its upward position, thereby preventing the locking pin 40 from moving outwardly of the body and holding the lock pin in position over the spindle nose flange 46a. As can be seen in the drawings, the release pin 42 has been engaged by the nose 46 and has been moved downwardly into the bore 44.

In order to remove the tool holder/adapter from the spindle for storage, the spindle nose is retracted into the turret, the retainer cup 36 engages the turret ring and moves downwardly, and the lock pin 40 is cammed outwardly by the retracting spindle nose. This permits the stop pin 42 to move upwardly under the action of the biasing spring 45 so as to assure positioning of the tip 42c in blocking relationship with the innermost edge 40a of the lock pin 40. The upward travel of the release pin 42 is controlled by the engagement of the junction of the intermediate section 42d and tip with the lower portion of the edge 40a.

Figure 5:
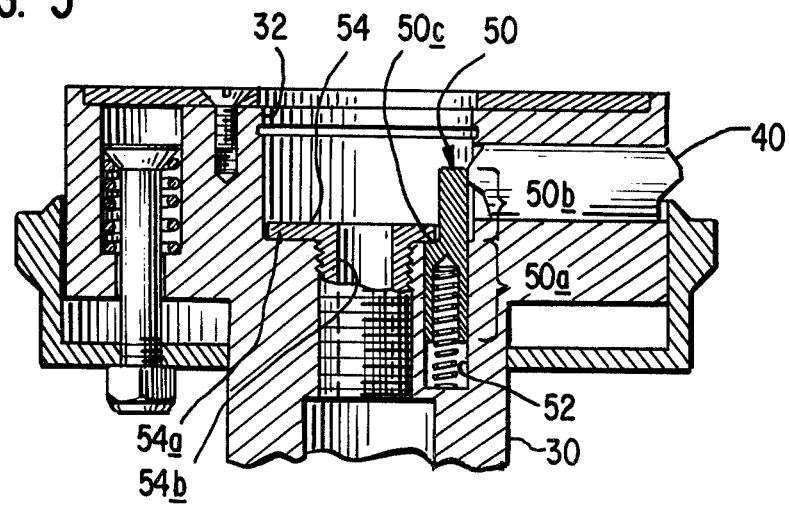
FIG. 5 is a vertical sectional view showing a tool holder/adapter which includes a second embodiment of the travel limit stop pin.

Referring now to FIG. 5, another embodiment of the release pin is shown. In this embodiment, the release pin 50 is positioned in a passageway 52 which is completely within or aligned with the central recess 32. The pin has a cylindrical lower section 50a, a smaller diameter upper section 50b, and a flat shoulder 50c. A threaded plug 54 is provided for cooperation with the shoulder 50c so as to limit the upward movement of the pin 50. This plug includes a flanged section 54a and a threaded lower section 54b which cooperates with a similarly threaded portion in the tool holder body 30.

Three small cutaway openings such as 54c are provided at the periphery of the flange 54b. The openings are arranged such that the upper sections of each of the release pins, such as 50, extend through the opening to engage a lock pin.

This system also provides for positive locking engagement between the lock pins, such as 40, and the stop pins. The manner of operation of the pins with the spindle nose is similar to that described hereinbefore. It will be noted that in this embodiment the manufacturing operation may be somewhat easier since the stop pin receiving bore 52 is aligned with the central recess and may be drilled directly from the central recess.

Figure 6:
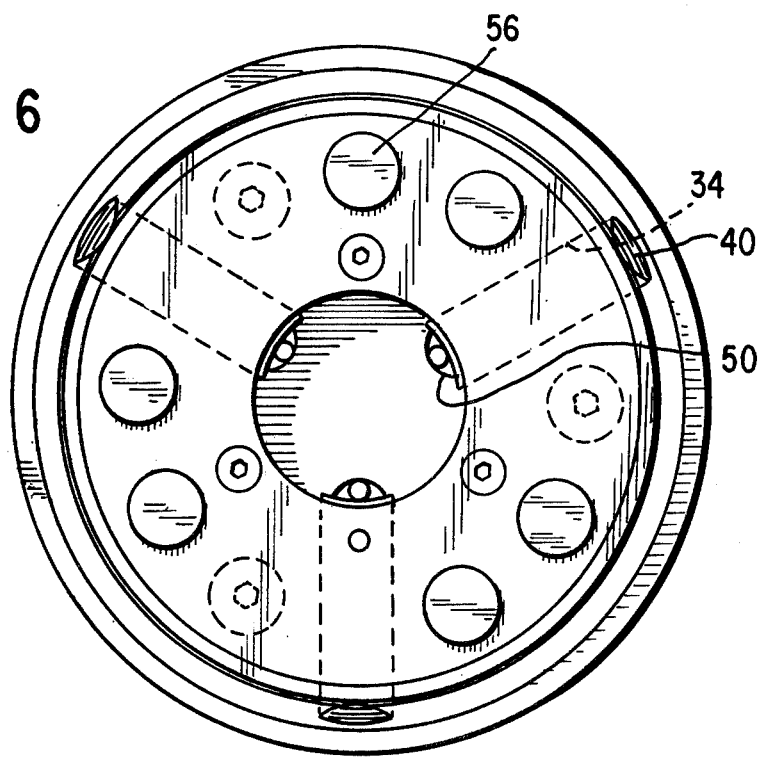
FIG. 6 is a top plan view showing a tool holder/adapter secured to a turret.

Referring now to FIG. 6, the lock pin passageways, such as 34, and the lock pins, such as 40, are shown in the turret locking position. The plug 54 and the release pin 50 are also seen.

In order to drivingly connect the tool holder/adapter to the drive spindle, six shot bolts, such as 56, are provided in the tool holder and one of these shot bolts will engage mating a shot bolt receiving cavity in the drive spindle so as to provide the driving relationship.

It will be appreciated that numerous changes and modifications can be made to the embodiment shown herein without departing from the spirit and scope of this invention.

What is claimed and desired to be secured by Letters Patent of the United States is:

1. An axially rotatable tool holder/adapter for use in a machine tool, which is adapted to engage a drive tool spindle in operation and adapted to be stored in a turret associated with a machine tool, wherein the holder/adapter includes:
   (a) a body portion having:
      (1) means defining a central recess for receiving a drive spindle,
      (2) means defining a plurality of substantially radially-disposed, open-ended lock pin passageways, each of which extends between the periphery of the body portion and the central recess means,
      (3) means defining a plurality of generally axially arranged travel-limit-stop-pin-receiving bores, each of said bores being at least partially aligned with the central recess means and associated with the inner end of each of said lock pin passageway means, (b) a plurality of lock pin means, each movable within one of said passageway means so as to extend outwardly from the peripheral end of said passageway means, in a storage position and so as to extend inwardly from the inner end of said passageway means into said central recess in the locked-to-the-spindle position, (c) retainer means carried by said body portion having peripheral wall means constructed to slidably fit about the periphery of said body portion, said retainer means being biased axially upwardly for movement between a blocking position whereat each lock pin is prevented from moving outwardly from the peripheral end of said passageway means and a retracted position whereat each lock pin can move outwardly thereof; and (d) a plurality of travel-limit-stop-pin means, each: (i) being positioned in one of said travel-limit-stop-pin bore means; (ii) being biased axially toward said central recess, (iii) being movable between an extended-lock-pin block position and a depressed release position; (iv) having means for blockingly engaging inner end of a locking pin and for preventing camming cooperation between said lock pin means and said stop-pin means, said means being fully aligned with said central recess; and (v) being constructed to be engaged by a descending spindle nose and depressed into said bore means so as to disengage said lock pin and permit inward movement of said lock pin to a spindle locking position, wherein each of said stop pin bore means is fully aligned with said central recess, and said stop-pin means includes shoulder means for cooperation in limiting upward movement of the stop-pin means, and wherein there is further provided flange means within said central recess for cooperation with said stop pin shoulder means for limiting upward movement.

2. A tool holder/adapter as in claim 1, wherein said stop pin includes:
means defining a lower section for sliding engagement with said pin-receiving bore, and
means defining an upper section having a reduced lock pin engaging tip constructed so that said tip and said lock pin contact within the central recess.

3. A tool holder/adapter as in claim 2, wherein said tip is eccentrically positioned on said pin.

4. A tool holder/adapter as in claim 3, wherein said tip is round and has a smaller diameter than said lower section and said upper section includes an intermediate section which joins said top and said lower section, with the junction of the tip and the intermediate section providing a shoulder for engaging the lock pin and limiting the upward travel of the stop pin.

* * * * *